(12) United States Patent
Tokita

(10) Patent No.: US 9,824,588 B2
(45) Date of Patent: Nov. 21, 2017

(54) ELECTRONIC DEVICE, CONTROL METHOD FOR ELECTRONIC DEVICE, AND CONTROL PROGRAM FOR ELECTRONIC DEVICE

(71) Applicant: JVC KENWOOD Corporation, Yokohama-shi, Kanagawa (JP)

(72) Inventor: Shigetoshi Tokita, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 15/217,055

(22) Filed: Jul. 22, 2016

(65) Prior Publication Data

US 2016/0328975 A1 Nov. 10, 2016

Related U.S. Application Data

(63) Continuation of application No. PCT/JP2014/005173, filed on Oct. 10, 2014.

(30) Foreign Application Priority Data

Jan. 31, 2014 (JP) .................................. 2014-016389
Mar. 28, 2014 (JP) .................................. 2014-067393

(51) Int. Cl.
*G08G 1/09* (2006.01)
*G08G 1/16* (2006.01)
(Continued)

(52) U.S. Cl.
CPC ............. *G08G 1/166* (2013.01); *B60W 30/09* (2013.01); *G06K 9/00805* (2013.01);
(Continued)

(58) Field of Classification Search
CPC ........ G08G 1/087; G08G 1/20; G08G 1/0112; G08G 1/0116; G08G 1/0145; G08G 1/017;
(Continued)

(56) References Cited

U.S. PATENT DOCUMENTS

2003/0112132 A1* 6/2003 Trajkovic ............... B60K 35/00
340/435
2007/0222639 A1* 9/2007 Giles ....................... G08G 1/07
340/907

(Continued)

FOREIGN PATENT DOCUMENTS

JP 2008299758 * 11/2008
JP 2008-299758 12/2008

(Continued)

OTHER PUBLICATIONS

International Search Report and Written Opinion for PCT App No: PCT/JP2014/005173 dated Dec. 22, 2014, 8 pgs.

*Primary Examiner* — Daniel Previl
(74) *Attorney, Agent, or Firm* — Procopio, Cory, Hargreaves & Savitch LLP

(57) ABSTRACT

An electronic device includes: a monitor unit configured to monitor a speed and a position of a host car and a preceding car; a reception unit configured to receive traffic signal information including at least a current display state of a traffic light in an intersection and timing information of a change of the display state of the traffic light; a prediction unit configured to generate a first prediction result and a second prediction result; and a warning unit configured to give a first-stage warning when the first prediction result indicates that the preceding car will go into the intersection after the traffic light changes to the red signal display state, and give a second-stage warning when the second prediction (Continued)

result indicates that the preceding car cannot stop without braking suddenly.

5 Claims, 11 Drawing Sheets

(51) Int. Cl.
*B60W 30/09* (2012.01)
*G06K 9/00* (2006.01)
*G08G 1/0962* (2006.01)
*G08G 1/0967* (2006.01)

(52) U.S. Cl.
CPC ....... G06K 9/00825 (2013.01); G08G 1/0967 (2013.01); G08G 1/09623 (2013.01)

(58) Field of Classification Search
CPC ............. G08G 1/08; G08G 1/096741; G08G 1/096775; G08G 1/015; G08G 1/02; G08G 1/04; G08G 1/0962; G08G 1/096716; G08G 1/123

USPC ....... 340/905, 436, 907, 933, 435, 901–904, 340/915–918, 924, 931, 932, 938, 340/991–994
See application file for complete search history.

(56) References Cited

U.S. PATENT DOCUMENTS

| 2009/0299857 A1* | 12/2009 | Brubaker | G06Q 30/02 705/14.66 |
| 2013/0093582 A1* | 4/2013 | Walsh | G08G 1/167 340/436 |

FOREIGN PATENT DOCUMENTS

| JP | 2009087062 A | 4/2009 |
| JP | 2011-154619 | 8/2011 |
| JP | 2012-088964 | 5/2012 |

* cited by examiner

ELECTRONIC DEVICE, CONTROL METHOD FOR ELECTRONIC DEVICE, AND CONTROL PROGRAM FOR ELECTRONIC DEVICE

CROSS REFERENCE TO RELATED APPLICATION

This application is based upon and claims the benefit of priority from PCT application No. PCT/JP2014/005173, filed Oct. 10, 2014, which claims priority from Japanese patent application No. 2014-016389, filed on Jan. 31, 2014 and Japanese patent application No. 2014-067393, filed on Mar. 28, 2014, the disclosure of which is incorporated herein in their entirety by reference.

BACKGROUND

The present invention relates to an electronic device, a control method for an electronic device, and a control program for an electronic device, and in particular to an electronic device, a control method for an electronic device, and a control program for an electronic device for notifying an occupant of necessary information based on received traffic signal information.

Among electronic devices mounted in cars, an electronic device for preventing a following car from bumping into a host car has been previously known. For example, Japanese Unexamined Patent Application Publication No. 2012-088964 discloses an electronic device that: receives information on a traffic light present in the traveling direction of the host car, the road on which the host car is traveling, and the like that is transmitted from a facility installed on the road, such as an optical beacon; and when the received information indicates a red signal display, predicts that a probability that the driver of the host car will perform an operation for reducing the speed is high, and draws the attention of the following car at a timing earlier than the timing when the probability of the operation for reducing the speed of the host car is low. In this way, it is possible to prevent the following car from bumping into the host car.

SUMMARY

However, although the related-art electronic device disclosed in Japanese Unexamined Patent Application Publication No. 2012-088964 can prevent the following car from bumping into the host car, it does not give any consideration to a risk that when a vehicle preceding the host car suddenly stops because a traffic light installed in the traveling direction of that vehicle changes to a red signal display, the host car could bump into the preceding vehicle.

To solve the above-mentioned problem, an electronic device according to the exemplary embodiment includes: a monitor unit configured to monitor a traveling speed and a traveling position of a host car, and a speed and a position of a preceding car, the host car being a vehicle in which the electronic device is mounted, the preceding car being a vehicle traveling ahead of the host car; a reception unit configured to receive traffic signal information including at least a current display state of a traffic light in an intersection located ahead of the host car in a traveling direction and timing information of a change of the display state of the traffic light; a prediction unit configured to generate a first prediction result of a prediction whether or not the preceding car will go into the intersection after the traffic light changes to a red signal display state when the preceding car maintains a current speed based on monitor information and the traffic signal information received by the reception unit, and generate, at a timing when the traffic light becomes the yellow signal display state, a second prediction result of a prediction whether or not the preceding car can stop before the intersection without braking suddenly based on the position and the speed of the preceding car and a distance between the preceding car and the intersection, the monitor information including the traveling speed and the traveling position of the host car and the speed and the position of the preceding car monitored by the monitor unit; and a warning unit configured to give a first-stage warning when the first prediction result indicates that the preceding car will go into the intersection after the traffic light changes to the red signal display state, and give a second-stage warning when the second prediction result indicates that the preceding car cannot stop before the intersection.

Further, to achieve the above-described object, a control method for an electronic device according to the exemplary embodiment includes: a monitoring step for monitoring a traveling speed and a traveling position of a host car, and a speed and a position of a preceding car, the preceding car being a vehicle traveling ahead of the host car; a receiving step for receiving traffic signal information including at least a current display state of a traffic light in an intersection located ahead of the host car in a traveling direction and timing information of a change of the display state of the traffic light; a predicting step for generating a first prediction result of a prediction whether or not the preceding car will go into the intersection after the traffic light changes to a red signal display state when the preceding car maintains a current speed based on monitor information and the traffic signal information received in the receiving step, and generating, at a timing when the traffic light becomes the yellow signal display state, a second prediction result of a prediction whether or not the preceding car can stop before the intersection without braking suddenly based on the position and the speed of the preceding car and a distance between the preceding car and the intersection, the monitor information including the traveling speed and the traveling position of the host car and the speed and the position of the preceding car monitored in the monitoring step; and a warning step for giving a first-stage warning when the first prediction result indicates that the preceding car will go into the intersection where after the traffic light changes to the red signal display state, and giving a second-stage warning when the second prediction result indicates that the preceding car cannot stop before the intersection without braking suddenly.

Further, to achieve the above-described object, a control program for an electronic device according to the exemplary embodiment for causing a computer to execute: a monitoring step for monitoring a traveling speed and a traveling position of a host car, and a speed and a position of a preceding car, the preceding car being a vehicle traveling ahead of the host car; a receiving step for receiving traffic signal information including at least a current display state of a traffic light in an intersection located ahead of the host car in a traveling direction and timing information of a change of the display state of the traffic light; a predicting step for generating a first prediction result of a prediction whether or not the preceding car will go into the intersection after the traffic light changes to a red signal display state when the preceding car maintains a current speed based on monitor information and the traffic signal information received in the receiving step, and generating, at a timing when the traffic light becomes the yellow signal display state, a second prediction result of a prediction whether or not the preceding car can stop before the intersection without braking suddenly based on the position and the speed of the preceding car and a distance between the preceding car and the intersection, the monitor information including the traveling speed and the traveling position of the host car and the speed and the position of the preceding car monitored in the monitoring step; and a warning step for giving a first-stage warning when the first prediction result indicates that the preceding car will go into the intersection after the traffic light changes to the red signal display state, and giving a second-stage warning when the second prediction result indicates that the preceding car cannot stop before the intersection without braking suddenly.

Further, to achieve the above-described object, a control program for an electronic device according to the exemplary embodiment for causing a computer to execute: a monitoring step for monitoring a traveling speed and a traveling position of a host car, and a speed and a position of a preceding car, the preceding car being a vehicle traveling ahead of the host car; a receiving step for receiving traffic signal information including at least a current display state of a traffic light located ahead of the host car in a traveling direction thereof and information on a timing when the display of the traffic light is changed; a predicting step for generating a first prediction result of a prediction whether or not the preceding car will go into the intersection where the traffic light changes to a red signal display state when the preceding car maintains a current speed thereof based on monitor information and the traffic signal information received in the receiving step, and generating a second prediction result of a prediction whether or not the preceding car can stop before the intersection where the traffic light becomes the red signal display state without braking suddenly based on the position and the speed of the preceding car and a distance between the preceding car and the intersection, the monitor information including the traveling speed and the traveling position of the host car and the speed and the position of the preceding car monitored in the monitoring step; and a warning step for giving a first-stage warning when the first prediction result indicates that the preceding car will go into the intersection where the traffic light changes to the red signal display state, and giving a second-stage warning when the second prediction result indicates that the preceding car cannot stop before the intersection where the traffic light is in the red signal display state without braking suddenly.

DETAILED DESCRIPTION

Next, exemplary embodiments are explained with reference to the drawings.

Figure 1:
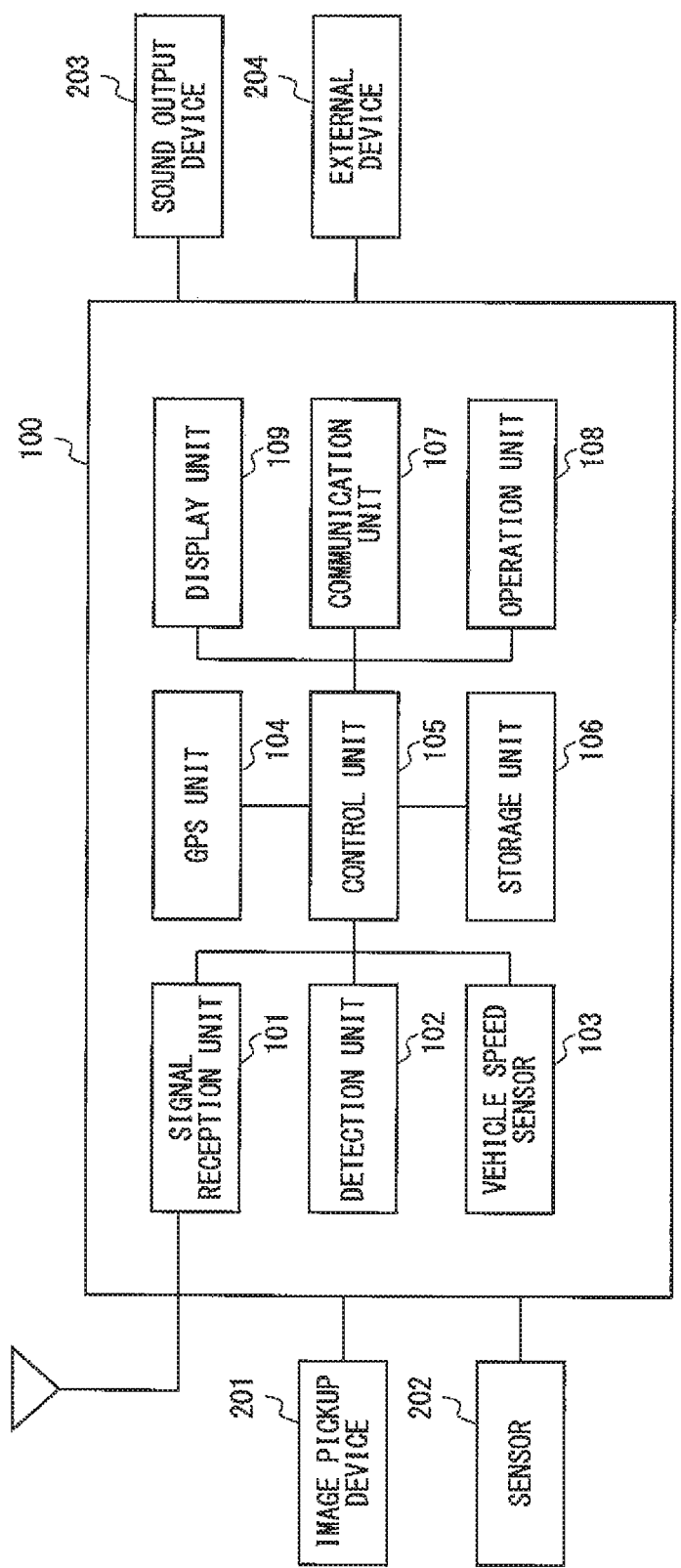
FIG. 1 is a block diagram of an exemplary embodiment of an electronic device.

FIG. 1 is a block diagram of an exemplary embodiment of an electronic device. In the figure, a navigation device 100, which is an electronic device according to this exemplary embodiment, is mounted in a vehicle (hereinafter called a "host car") of a user (a driver) and has a function of displaying map information for the user, a function of guiding the user through a route, and so on. Further, the navigation device 100 can externally receive information such as traffic information, display a still image or a moving image of a periphery of the vehicle taken by an image pickup device 201, and so on.

The navigation device 100 includes a signal reception unit 101, a detection unit 102, a vehicle-speed sensor 103, a GPS unit 104, a control unit 105, a storage unit 106, a communication unit 107, an operation unit 108, and a display unit 109. The detection unit 102, the vehicle-speed sensor 103, the GPS unit 104, and the control unit 105, together with an image pickup device 201 and a sensor 202, constitute monitor means. Further, the control unit 105 constitutes prediction means and also constitutes, together with at least one of the display unit 109 and a sound output device 203, warning means.

The signal reception unit 101 constitutes reception means and receives traffic signal information transmitted by a road-side unit installed in a road-side position located, for example, 300 m before an intersection with a traffic light in the vehicle approaching direction. The traffic signal information is transmitted, for example, by an optical beacon (DSSS Level 2). The traffic signal information is information including a current display state (red/yellow/blue) of the traffic light and the number of seconds before the display of the traffic light changes from blue to red or from red to blue next time. The signal reception unit 101 supplies the received traffic signal information to the control unit 105.

The detection unit 102 receives information on an image of what is present ahead of the host car with the navigation device 100 mounted therein in the traveling direction thereof which is taken and transmitted by the image pickup device 201. Further, the detection unit 102 receives information on a distance between the host car and a vehicle traveling ahead of the host car in the traveling direction thereof (hereinafter called a "preceding car") and a relative speed between the host car and the preceding car from the sensor 202. Further, the detection unit 102 detects information on an image of the preceding car from the image taken by the image pickup device 201 by using an image recognition technique and supplies the detection information received from the sensor 202 to the control unit 105.

The vehicle-speed sensor 103 measures a pulse signal that changes according to, for example, the rotation of the output shaft or the driven wheel of a transmission and thereby detects the speed of the host car. The vehicle-speed sensor 103 supplies the vehicle-speed information to the control unit 105. The GPS unit 104 has a publicly-known configuration for receiving signals transmitted from a plurality of GPS satellites that constitute a publicly-known GPS (Global Positioning System) and thereby measuring the position (a latitude, a longitude, and the like) of the host car. The GPS unit 104 supplies position information indicating the measured position of the host car to the control unit 105.

The control unit 105 includes, for example, a CPU (Central Processing Unit), a ROM (Read Only Memory), a RAM (Random Access Memory), an internal timer, and so on. The control unit 105 controls the whole navigation device 100 in a centralized manner, for example, by having the CPU execute a program stored in the ROM. The control unit 105 predicts whether or not the preceding car will stop at an intersection through a later-described process based on the traffic signal information supplied from the signal reception unit 101, the detection information supplied from the detection unit 102, the vehicle-speed information supplied from the vehicle-speed sensor 103, the position information supplied from the GPS unit 104, and so on. As a result of the prediction, if necessary, the control unit 105 supplies warning information to the sound output device 203 and/or the display unit 109. Alternatively, the control unit 105 supplies warning information to an external device 204 through the communication unit 107.

The storage unit 106 stores information necessary for a display and a route search, such as map information (road information) and various images. The storage unit 106 reads necessary information and supplies it to the control unit 105 in response to a request from the control unit 105. The storage unit 106 includes at least one of various publicly-known storage media such as an HDD (Hard Disk Drive), an optical disk, a memory card, and a semiconductor storage device. The communication unit 107 transmits/receives information necessary for communication to/from the external device 204 through a connector (cable) in conformity with a certain standard. Note that when the navigation device 100 is connected to the external device 204 in conformity with a wireless standard, the communication unit 107 transmits/receives information necessary for communication to/from the external device 204 in conformity with that wireless standard.

The operation unit 108 includes a touch panel or the like disposed on the front surface of the display unit 109 and receives an operation (an instruction input or the like) from a user. Note that the operation unit 108 may be an infrared remote controller or the like, or may be a hardware key disposed on the housing of the operation unit 108. The display unit 109 includes, for example, a liquid crystal display device or the like and displays a map image (a road image) and the like. Note that the display unit 109 may not be disposed in the navigation device 100. That is, the navigation device 100 may be connected to a separate external display device. When this external display device is a display device with a touch panel, the operation unit 108 may also be an external device.

The navigation device 100 is connected to the external image pickup device 201 and the external sound output device 203. The image pickup device 201 includes, for example, a camera or the like. Further, the image pickup device 201 takes an image of what is present ahead of the host car in the approaching direction thereof and supplies the image-taking information to the detection unit 102. The sensor 202 is, for example, a radar sensor or the like, and detects the distance between the host car and the preceding car traveling ahead of the host car and the relative speed between the host car and the preceding car. The sound output device 203 includes, for example, a speaker or the like and outputs a guidance sound of the navigation device 100 and a warning sound.

Figure 2:
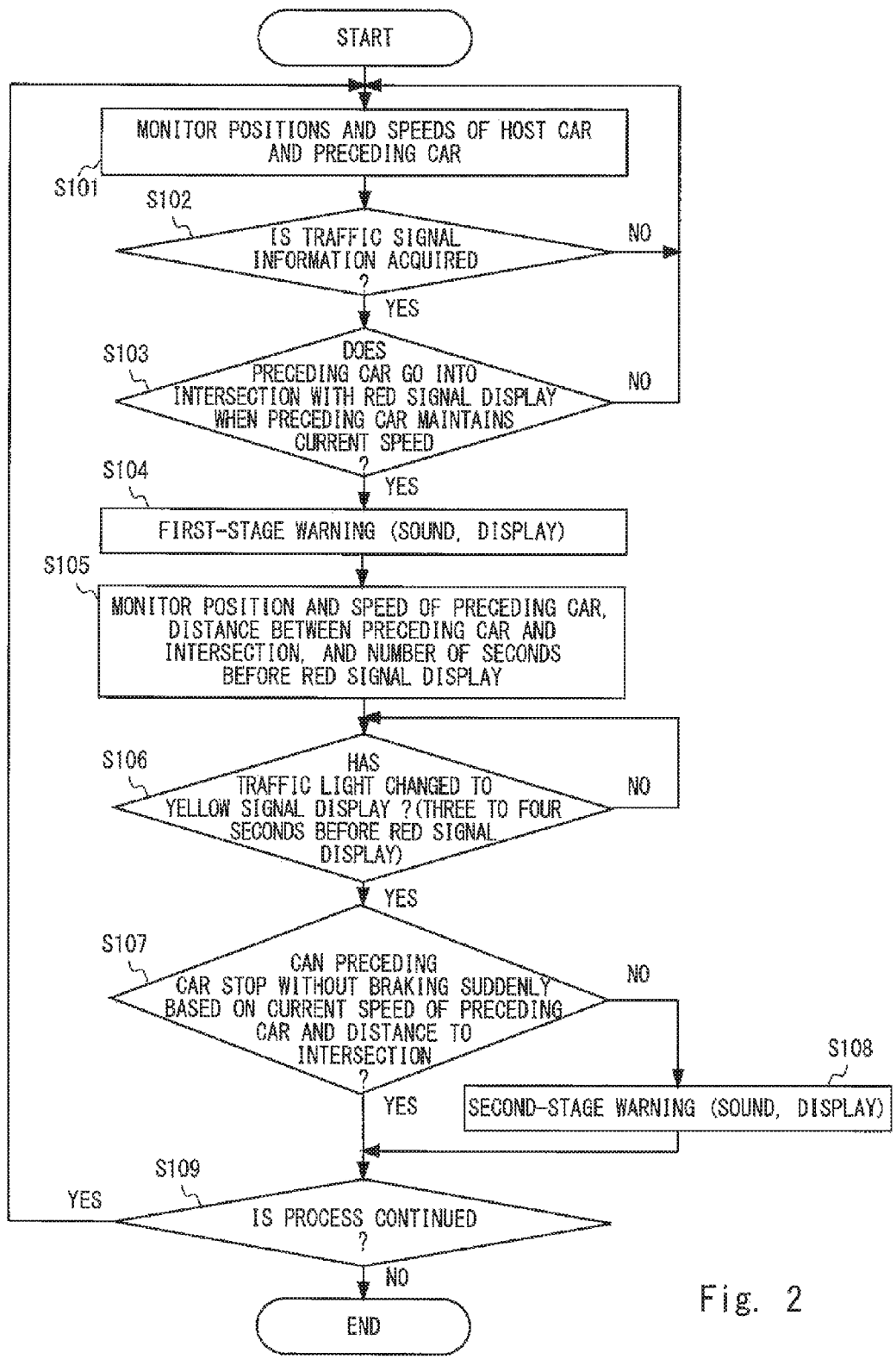
FIG. 2 is a flowchart for explaining an operation in a first exemplary embodiment of an electronic device.

Next, processes for deciding to make a sudden stop and for warning performed by the navigation device 100 having the above-described configuration according to this exemplary embodiment are explained with reference to FIG. 2. FIG. 2 is a flowchart for explaining an operation in a first exemplary embodiment of an electronic device.

Firstly, the control unit 105 calculates the speed of the host car by using the vehicle-speed information supplied from the vehicle-speed sensor 103 and also calculates the position of the host car by using the position information supplied from the GPS unit 104. Then, the control unit 105 calculates the position and the speed of the preceding car by using the information on the image of the preceding car taken by the image pickup device 201 and information on the distance and the relative speed between the preceding car and the host car detected by the sensor 202, both of which are supplied from the detection unit 102, as well as the information on the position and the speed of the host car. The control unit 105 monitors the position and the speed of the host car, and the position and the speed of the preceding car (step S101).

Next, the signal reception unit 101 receives traffic signal information transmitted by a road-side unit, such as an optical beacon, installed in a road-side position located, for example, 300 m before an intersection with a traffic light in the approaching direction, and the control unit 105 determines whether or not it was able to acquire the received traffic signal information from the signal reception unit 101 (step S102). When the control unit 105 was not able to acquire the traffic signal information from the signal reception unit 101, the control unit 105 continues the monitoring in the step S101, whereas when the control unit 105 was able to acquire the traffic signal information, the control unit 105 proceeds to a step S103.

In the step S103, the control unit 105 predicts, based on the acquired traffic signal information, when the preceding car maintains the current speed, whether or not the preceding car goes into the intersection located ahead of the host car and the preceding car in the traveling direction thereof when the traffic light located in the intersection is in a red signal display state.

As described previously, the traffic signal information is information including a current display state (red/yellow/blue) of the traffic light located ahead of the host car in the traveling direction thereof and the number of seconds before the display of the traffic light changes from blue to red or from red to blue next time. Therefore, when the current display state of the traffic light is in a blue signal display state, the control unit 105 can predict that the traffic light will change to a red signal display state, for example, in 12 seconds. In this state, assuming that the control unit 105 has obtained a monitoring result indicating that the preceding car is traveling on the road 200 m before the intersection at 60 km per hour (i.e., 16.6 m per second) in the step S101, the control unit 105 obtains a prediction result indicating that when the preceding car maintains the current speed, the preceding car will go into the intersection in 12 seconds, i.e., at the moment when the display state of the traffic light in the intersection changes to the red signal display state in the step S103.

When the control unit 105 cannot obtain a prediction result indicating that the preceding car will go into the intersection where the traffic light is in the red signal display state in the step S103, the control unit 105 continues the monitoring process in the step S101, whereas when the control unit 105 can obtain a prediction result indicating that the preceding car will go into the intersection where the traffic light is in the red signal display state, the control unit 105 proceeds to a step S104 upon obtaining that decision result and gives the driver (the user) of the host car a first-stage warning. In the first-stage warning in the step S104, information indicating that there is a possibility that the preceding car will go into the intersection where the traffic light is in the red signal display state is displayed in the display unit 109 and a warning sound is produced by the sound output device 203. Note that only one of the warning display by the display unit 109 and the warning sound produced by the sound output device 203 may be used. This first-stage warning is not only for drawing the driver's attention to the behavior of the preceding car because the host car following the preceding car will also go into the intersection where the traffic light is in the red signal display state as a matter of course, but also for drawing the driver's attention to the speed of the host car.

Subsequent to the warning in the step S104, the control unit 105 continues monitoring the position of the preceding car, the speed of the preceding car, the distance between the preceding car and the intersection, and the number of seconds before the traffic light in the intersection changes to a red signal display (step S105). Next, the control unit 105 determines whether or not it is the timing when the traffic light ahead of the preceding and host cars in the traveling direction thereof changes from a blue signal display state to a yellow signal display state based on the previously received traffic signal information (step S106).

Note that the control unit 105 may use a state where the traffic light ahead of the preceding and host cars in the traveling direction thereof is in a yellow signal display state as the criterion for the determination in the step S106 based on newly received traffic signal information. Since the traffic signal information is provided through an optical beacon, the control unit 105 is not necessarily able to receive new traffic signal information at all times. Therefore, in the step S106, either the previously received traffic signal information or the newly received traffic signal information may be used. Alternatively, a priority may be given to a predetermined one of these traffic signal information items, or a priority may be given to the earlier one of the switching timing that is calculated by using the previously received traffic signal information and the switching timing that is calculated by using the newly received traffic signal information.

Next, when the control unit 105 determines that it is the timing when the traffic light in the intersection changes from a blue signal display state to a yellow signal display state in the step S106, the control unit 105 determines, at the timing when the traffic light changes to the yellow signal display state, whether or not the preceding car can stop safely without braking suddenly based on the current speed of the preceding car and the distance between the preceding car and the intersection (step S107). The determination in the step S107 is made within a period in which the traffic light blinks the yellow signal display before changing from the yellow signal display state to a red signal display state (e.g., within three to four seconds).

The determination process in the step S107 will now be explained in a more detailed manner. It is considered that it takes about one second from when the driver decides to stop the vehicle to when the driver starts braking. The distance that the vehicle travels in that one second is called an "idle running distance". A stopping distance is the sum of the idle running distance and a braking distance that is a distance the vehicle travels from when the driver actually applies the brakes to when the vehicle stops. Table 1 shows an example showing, in a state where the vehicle brakes suddenly, idle running distances, braking distances, and stopping distances versus speeds (km/h) of the vehicle under a condition that the road surface is dried.

TABLE 1

| SPEED [km/h] | IDLE RUNNING DISTANCE [m] | BRAKING DISTANCE [m] | STOPPING DISTANCE [m] |
| --- | --- | --- | --- |
| 20 | 6 | 2 | 8 |
| 30 | 11 | 9 | 20 |
| 60 | 17 | 20 | 37 |
| 80 | 22 | 36 | 58 |
| 100 | 28 | 56 | 84 |
| 120 | 33 | 81 | 114 |

Next, stopping distances in a case where the preceding car brakes suddenly and stops during the period of about three to four second in which the traffic light remains in a yellow signal display state (i.e., stopping distances from the position of the preceding car at the moment when the traffic light changes to a yellow signal display state) are shown in the below Table 2.

TABLE 2

STOPPING DISTANCE OF PRECEDING CAR FROM POINT WHEN YELLOW SIGNAL DISPLAY HAS CONTINUED 0 SECOND TIMING OF DETERMINATION ON STOP

| SPEED [km/h] | YELLOW SIGNAL DISPLAY 0 SECOND | YELLOW SIGNAL DISPLAY 1 SECOND | YELLOW SIGNAL DISPLAY 2 SECONDS | YELLOW SIGNAL DISPLAY 3 SECONDS |
| --- | --- | --- | --- | --- |
| 20 | 8 | 14 | 20 | 26 |
| 30 | 20 | 31 | 42 | 53 |
| 60 | 37 | 54 | 71 | 88 |
| 80 | 58 | 80 | 102 | 124 |
| 100 | 84 | 112 | 140 | 168 |
| 120 | 114 | 147 | 180 | 213 |

As seen from Table 2, for example, when the preceding car traveling at 20 km/h brakes suddenly during the period of about three to four seconds in which the traffic light remains in the yellow signal display state, the preceding car stops after moving 8 m to 26 m from the place where the preceding car is located at the moment when the traffic light changed to the yellow signal display state. This means that when the distance between the preceding car traveling at 20 km/h and the intersection is equal to or shorter than 8 m to 26 m, the preceding car cannot stop before the stop line located before the intersection unless the preceding car brakes suddenly.

Therefore, in the step S107, the control unit 105 determines, based on the speed of the preceding car and the distance between the preceding car and the intersection obtained at the moment when the traffic light changes to the yellow signal display state, whether or not the preceding car can stop at the stop line located before the intersection without braking suddenly by determining whether or not the distance between the preceding car and the intersection corresponding to the speed of the preceding car is equal to or shorter than the pre-defined threshold shown in the below Table 3.

TABLE 3

| | DISTANCE BETWEEN PRECEDING CAR AND INTERSECTION AT POINT WHEN TRAFFIC LIGHT CHANGES TO YELLOW SIGNAL DISPLAY | | |
|---|---|---|---|
| SPEED [km/h] | THRESHOLD SETTING 1 | THRESHOLD SETTING 2 | THRESHOLD SETTING 3 |
| 20 | 26 | 32 | 38 |
| 30 | 53 | 64 | 75 |
| 60 | 88 | 105 | 122 |
| 80 | 124 | 146 | 168 |
| 100 | 168 | 196 | 224 |
| 120 | 213 | 246 | 279 |

Table 3 shows an example of settings in which the allowance (or margin) for determination using "Threshold Setting 2" is larger than that for the determination using "Threshold Setting 1" and smaller than that of the determination using "Threshold Setting 3". That is, when the "Threshold Setting 3" is adopted, the distance by which the preceding car can stop by braking suddenly is estimated to be a larger value than those when the "Threshold Setting 1" or the "Threshold Setting 2" is adopted. Therefore, safety is the highest when the "Threshold Setting 3" is adopted. The driver can arbitrarily select any one of those three types of settings based on, for example, his/her driving skill and/or the braking performance of the vehicle. Further, since the braking distance and the stopping distance become longer when it rains than when the road is dry, threshold settings for rainy weather may be separately defined. Further, the detection unit 102 may determine whether it is raining or not based on image information output from the image pickup device 201 by using an image recognition technique, and threshold settings for rainy weather may be automatically adopted in rainy weather. Alternatively, the On/Off signal of windshield wipers may be detected for determining whether it is raining or not.

Figure 3:
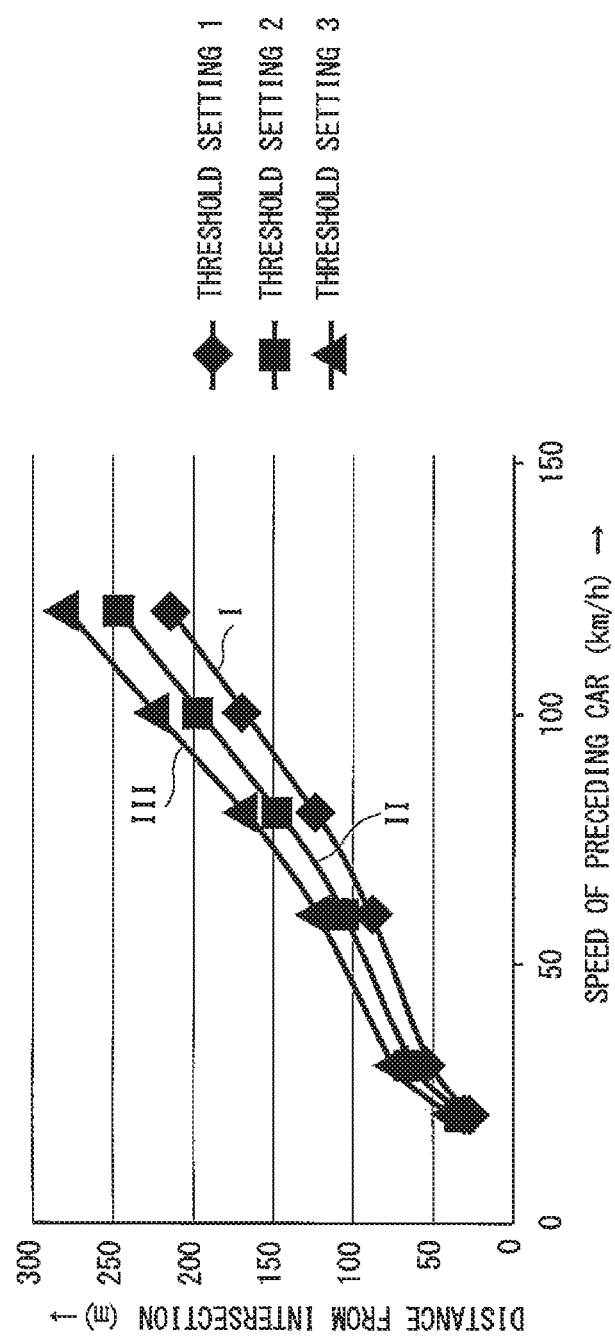
FIG. 3 is a graph showing a relation shown in Table 3, i.e., a relation between speeds of a preceding car and distances to an intersection obtained when a traffic light becomes a yellow signal display state and three types of threshold settings.

FIG. 3 is a graph showing a relation shown in Table 3, i.e., a relation between speeds of the preceding car and distances to the intersection obtained at the moment when the traffic light becomes a yellow signal display state shown in Table 3 and three types of threshold settings. In FIG. 3, the line I indicates a characteristic (i.e., a relation) between speeds of the preceding car and distances to the intersection when the Threshold Setting 1 is adopted. Further, the lines II and III indicate these characteristics when Threshold Settings 2 and 3, respectively, are adopted.

In the step S107, when the control unit 105 determines that the distance between the preceding car and the intersection corresponding to the speed of the preceding car at the moment when the traffic light changes to the yellow signal display state is equal to or shorter than the pre-defined threshold, the control unit 105 determines that the preceding car cannot stop safely at the stop line position located before the intersection without braking suddenly (No at S107) and gives a second-stage warning (step S108). In the second-stage warning in the step S108, information indicating that there is a risk that the host car could bump into the preceding car because of the sudden braking by the preceding car is displayed in the display unit 109 and a warning sound is produced by the sound output device 203. By doing so, the driver's attention is drawn to the risk. Note that only one of the warning display by the display unit 109 and the warning sound produced by the sound output device 203 may be used.

Further, it is preferable for the second-stage warning in the step S108 to have a more urgent aspect and indicate a stronger risk than those of the first-stage warning in the step S104 in view of the emergency and the risk. Further, the way of informing the driver of the warning in the first-stage warning may be changed in the second-stage warning. For example, while the first-stage warning may be to warn the driver by superposing the warning on the map image in the display unit 109, the second-stage warning may be to warn the driver by displaying only the warning image over the entire screen of the display unit 109. Alternatively, the percentage of the area of the entire screen of the display unit 109 occupied by the warning image may be changed. For example, the percentage of the area occupied by the warning image may be 30% for the first-stage warning and 80% for the second-stage warning. That is, the warning may be differentiated by changing the size of the warning image. Note that in the step S108, the driver of the host car can be urged to reduce the speed by giving the driver the second-stage warning. Therefore, even when the preceding car does not brake suddenly and passes through the intersection where the traffic light is in the red-display state, it is possible, by urging the driver of the following host car to reduce the speed, to enable the driver of the host car to have enough time to stop the host car at the stop line position located before the intersection where the traffic light is in the red-display state. This is also desirable in view of the safe driving.

The explanation is continued by referring to FIG. 2 again. In the step S107, when the control unit 105 determines that the distance between the preceding car and the intersection corresponding to the speed of the preceding car at the moment when the traffic light changes to the yellow signal display state is larger than the pre-defined threshold, i.e., determines that the preceding car can stop at the stop line position located before the intersection without braking suddenly (Yes at S107) or when the second-stage warning is given in the step S108, the control unit 105 determines whether or not the above-described process should be continued (step S109). Specifically, when the driver has made a request for terminating the process by entering an instruction or the like through the operation unit 108 or when there is no need to continue the process because the host car is parked or the like, the process is not continued. When the process should be continued, it returns to the step S101.

As described above, according to the navigation device 100, which is an electronic device according to this exemplary embodiment, it is possible, by monitoring the positions and the speeds of the preceding car and the host car and calculating the current speed of the preceding car, distances from the preceding car to an intersection with a traffic light located ahead of the host car and the preceding car in the traveling direction thereof, and the timing when the traffic light changes its display state based on received traffic signal information, to predict whether or not the preceding car can stop at the stop line position located before the intersection without braking suddenly when the traffic light changes to the red signal display state at the point of time when the host car receives the traffic light information and at the point of time when the traffic light changes to the yellow signal display state. Therefore, when it is predicted that the preceding car cannot stop at the stop line position located before the intersection without braking suddenly, it is possible to warn in advance the driver of a risk that the host car could bump into the preceding car because of the sudden braking by the preceding car and thereby reduce the possibility of a collision with the preceding car. Therefore, according to this embodiment, it is possible to inform the occupant of a risk that the host car could bump into the preceding car by predicting the stop of the preceding car.

Figure 4:
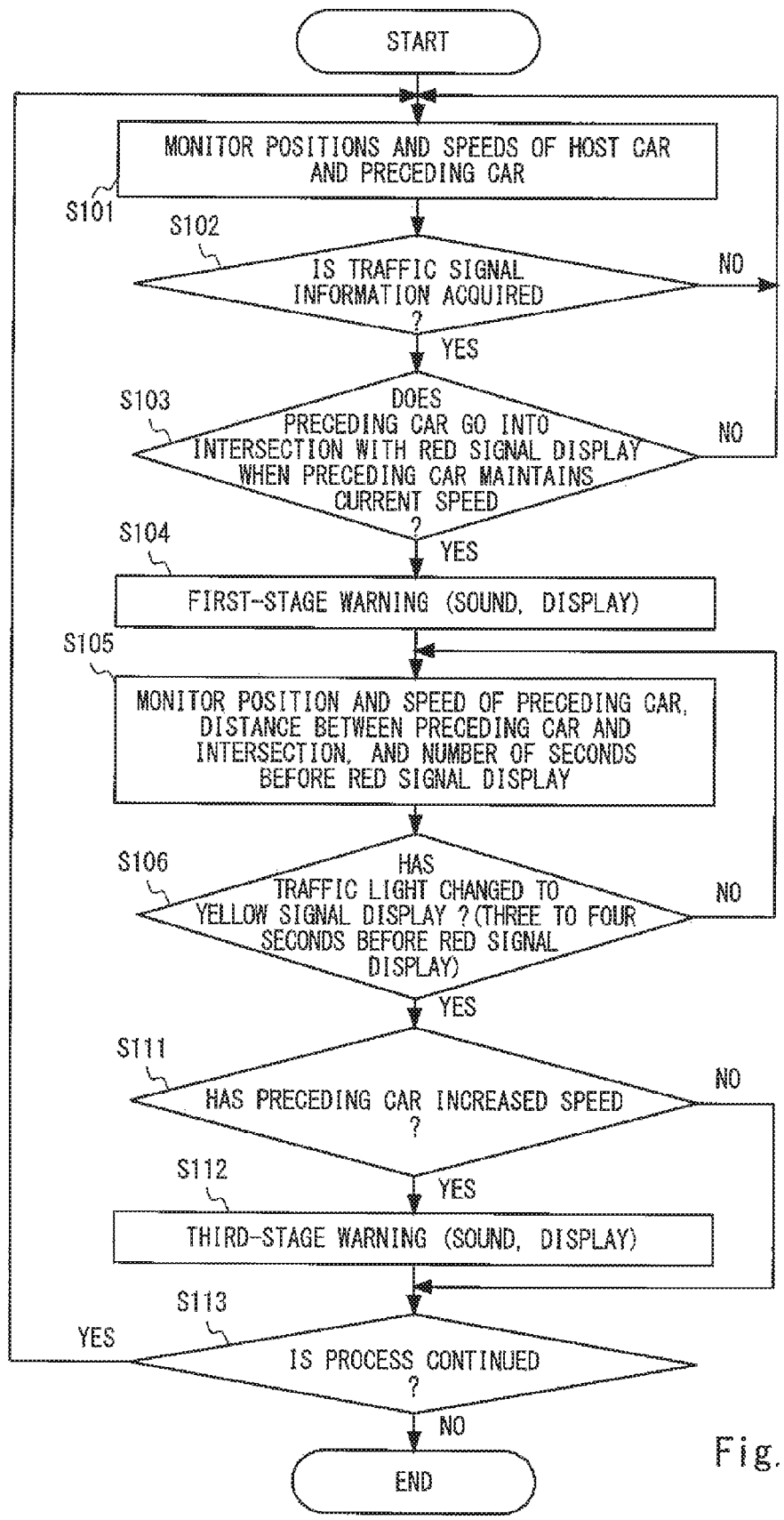
FIG. 4 is a flowchart for explaining an operation in a second exemplary embodiment of an electronic device.

Next, an operation in a second exemplary embodiment is explained. FIG. 4 is a flowchart for explaining an operation in the second exemplary embodiment of an electronic device. In FIG. 4, the same symbols as those in FIG. 2 are assigned to the same process steps as those shown in FIG. 2 and their explanations are omitted. In this exemplary embodiment, processes in steps S111 to S113 are performed in place of the processes in the step S107 and the subsequent steps in the flowchart shown in FIG. 2. In this exemplary embodiment, after the preceding car increases its speed when or after the traffic light changes to a yellow signal display state, there is a possibility that the preceding car could brake suddenly immediately before the preceding car goes into the intersection due to a red signal display of the traffic light or the like. Therefore, a warning is given to the driver.

That is, when the control unit 105 determines that it is the timing when the traffic light in the intersection changes from a blue signal display state to a yellow signal display state in the step S106 in FIG. 4, the control unit 105 determines, at the timing when the traffic light changes to the yellow signal display state, whether or not the preceding car has increased its speed by using, for example, image-taking information of the image pickup device 201 (step S111). When the control unit 105 determines that the preceding car has increased the speed in the step S111, the control unit 105 predicts that there is a possibility that the preceding car cannot stop safely, for the red signal display state of the traffic light or the like, at the stop line position located before the intersection without braking suddenly because the preceding car has increased the speed and hence gives a third warning, which is a warning against the collision or the like, by using a sound, an image display, and/or the like (step S112).

On the other hand, when the control unit 105 determines that the preceding car has not increased the speed in the step S111, the control unit 105 determines whether or not the process should be continued (step S113). When the third warning is given in the step S112, the control unit 105 also determines whether or not the process should be continued (step S113). When the driver has made a request for terminating the process by entering an instruction or the like through the operation unit 108 or when there is no need to continue the process because the host car is parked or the like, the process is not continued. When the process should be continued, it returns to the step S101. Note that the process in the second exemplary embodiment may be combined with the process in the first exemplary embodiment, or may be combined with processes in the below-shown other exemplary embodiments.

Figure 5:
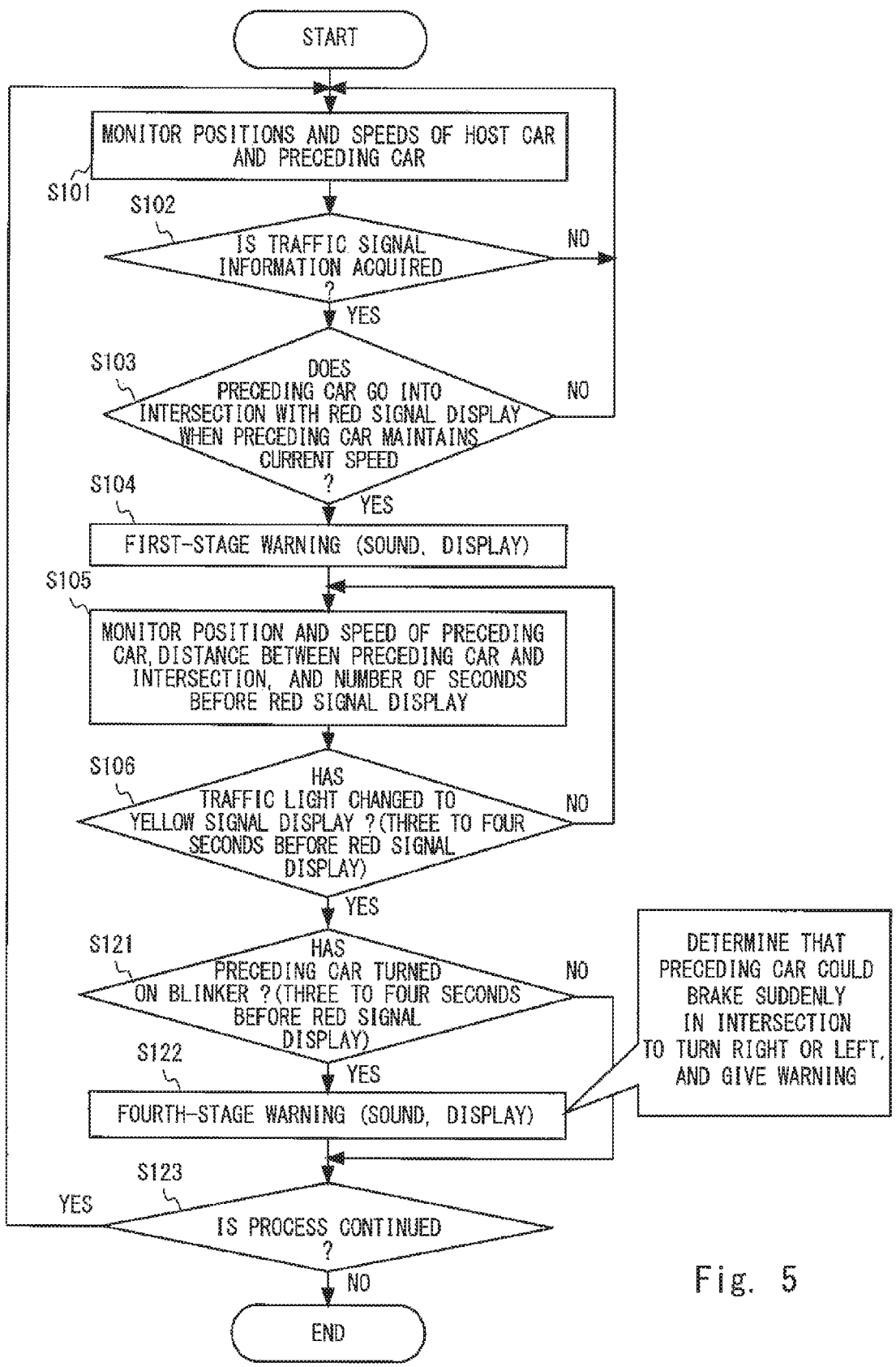
FIG. 5 is a flowchart for explaining an operation in a third exemplary embodiment of an electronic device.

Next, an operation in a third exemplary embodiment is explained. FIG. 5 is a flowchart for explaining an operation in the third exemplary embodiment of an electronic device. In FIG. 5, the same symbols as those in FIG. 2 are assigned to the same process steps as those shown in FIG. 2 and their explanations are omitted. In this exemplary embodiment, processes in steps S121 to S123 are performed in place of the processes in the step S107 and the subsequent steps in the flowchart shown in FIG. 2. In the third exemplary embodiment, when the preceding car turns on a blinker (i.e., a turn-signal) when or after the traffic light changes to a yellow signal display state, there is a possibility that the preceding car could brake suddenly in order to turn right or left at the intersection. Therefore, a warning is given to the driver.

That is, when the control unit 105 determines that it is the timing when the traffic light in the intersection changes from a blue signal display state to a yellow signal display state in the step S106 in FIG. 5, the control unit 105 determines, at the timing when the traffic light changes to the yellow signal display state, whether or not the preceding car has turned on a blinker by using, for example, image-taking information of the image pickup device 201 (step S121). When the control unit 105 determines that the preceding car has turned on the blinker in the step S121, the control unit 105 predicts that there is a possibility that the preceding car could brake suddenly in order to turn right or left in the intersection and hence gives a fourth warning, which is a warning against the collision or the like, by using a sound, an image display, and/or the like (step S122). On the other hand, when the control unit 105 determines that the preceding car has not turned on the blinker in the step S121, the control unit 105 determines whether or not the process should be continued (step S123). When the fourth warning is given in the step S122, the control unit 105 also determines whether or not the process should be continued (step S123). When the driver has made a request for terminating the process by entering an instruction or the like through the operation unit 108 or when there is no need to continue the process because the host car is parked or the like, the process is not continued. When the process should be continued, it returns to the step S101. Note that the process in the third exemplary embodiment may be combined with at least one of the processes in the first and second exemplary embodiments, or may be combined with processes in the below-shown other exemplary embodiments.

Figure 6A:
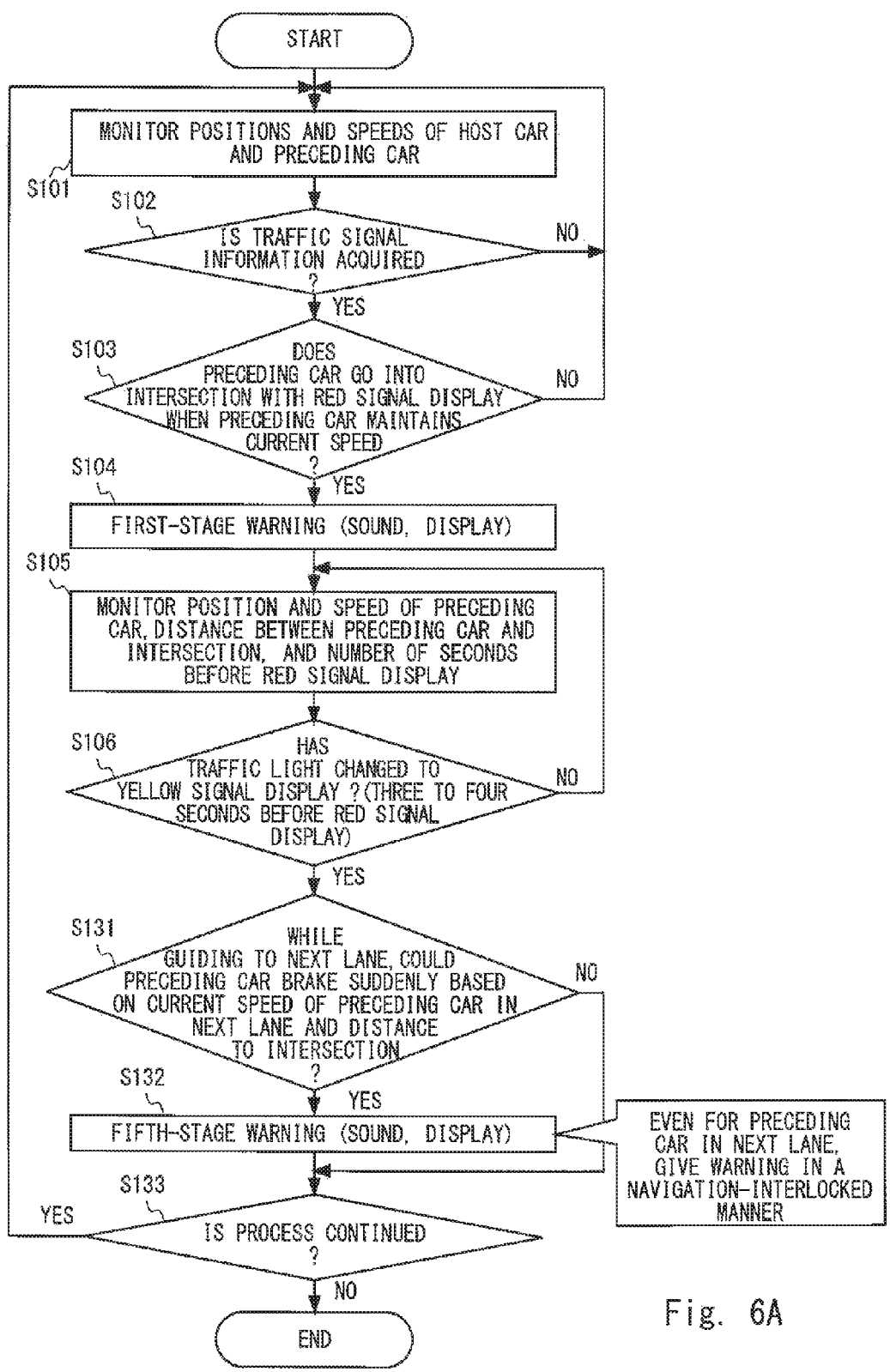
FIG. 6A is a flowchart for explaining an operation in a fourth exemplary embodiment of an electronic device.

Next, an operation in a fourth exemplary embodiment is explained. FIG. 6A is a flowchart for explaining an operation in the fourth exemplary embodiment of an electronic device. In FIG. 6A, the same symbols as those in FIG. 2 are assigned to the same process steps as those shown in FIG. 2 and their explanations are omitted. In this exemplary embodiment, processes in steps S131 to S133 are performed in place of the processes in the step S107 and the subsequent steps in the flowchart shown in FIG. 2. In the fourth exemplary embodiment, it is determined, when or after the traffic light changes to a yellow signal display state, whether or not, when the navigation device is guiding the host car to move to a next lane, a preceding car that is present in the next lane could possibly brake suddenly. Then, a warning is given to the driver.

Figure 6B:
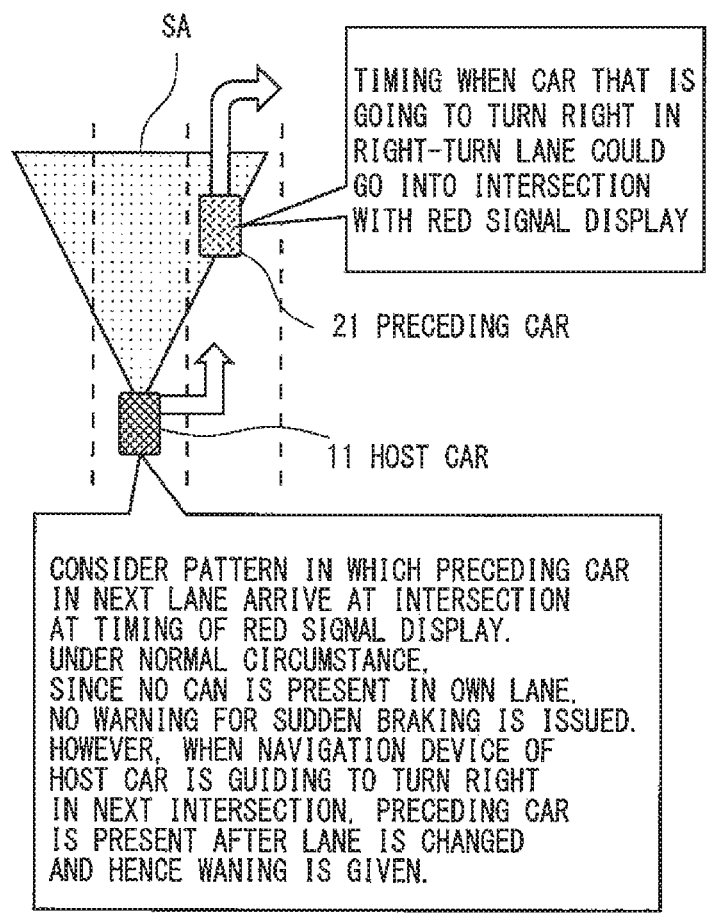
FIG. 6B is a figure for explaining operations in main steps of the fourth exemplary embodiment of the electronic device.

In this case, when the control unit 105 determines that it is the timing when the traffic light in the intersection changes from a blue signal display state to a yellow signal display state in the step S106 in FIG. 6A, then the control unit 105 determines, at the timing when the traffic light changes to the yellow signal display state, whether or not the navigation device is guiding the host car to a next lane and a preceding car that is present in the next lane could possibly brake suddenly (step S131 in FIG. 6A). That is, in the step S131, as shown in FIG. 6B as an example, when the navigation device is guiding the host car 11 to move to a next lane for a right-turn (hereinafter called a "right-turn lane") in order to turn right at the next intersection, a vehicle that is traveling in a sensing area (i.e., a detection area) SA located ahead of the host car 11 in the traveling direction thereof and traveling in the next right-turn lane will become a preceding car 21 after the lane change. Therefore, the control unit 105 predicts whether or not the preceding car 21 will go into the next intersection at a timing when the traffic light in the next intersection is in a red signal display state, i.e., whether or not there is a possibility that the host car 11 could bump into the preceding car 21 because the preceding car 21 could brake suddenly at the intersection based on the current speed of the preceding car 21 and the distance between the preceding car 21 and the next intersection.

When the control unit 105 determines that there is a possibility that the preceding car traveling in the next lane could brake suddenly in the step S131, the control unit 105 warns, as a fifth warning, the driver of the possibility of the collision by using a sound, an image display, and/or the like (step S132 in FIG. 6A). On the other hand, when the control unit 105 determines that the navigation device is not guiding the host car to the next lane, that there is no behavior indicating the move to the next lane, that no preceding car is present in the destination lane, i.e., in the next lane, or that the preceding car is not expected to brake suddenly because the preceding car is already in a stopped state or the like in the step S131 (No at step S131), the control unit 105 determines whether or not the process should be continued (step S133). When the fifth warning is given in the step S132, the control unit 105 also determines whether or not the process should be continued (step S133). When the driver has made a request for terminating the process by entering an instruction or the like through the operation unit 108 or when there is no need to continue the process because the host car is parked or the like, the process is not continued. When the process should be continued, it returns to the step S101. Note that the process in the fourth exemplary embodiment may be combined with at least one of the processes in the first to third exemplary embodiments, or may be combined with the below-shown processes. Further, the determination on whether or not the preceding car in the next lane will brake suddenly may be made by using the same criterion as that used in the determination on the sudden braking performed by the preceding car traveling in the same lane as that of the host car as in the case of the first exemplary embodiment. Alternatively, the prediction/determination on the sudden braking may be made by using other methods.

Figure 7A:
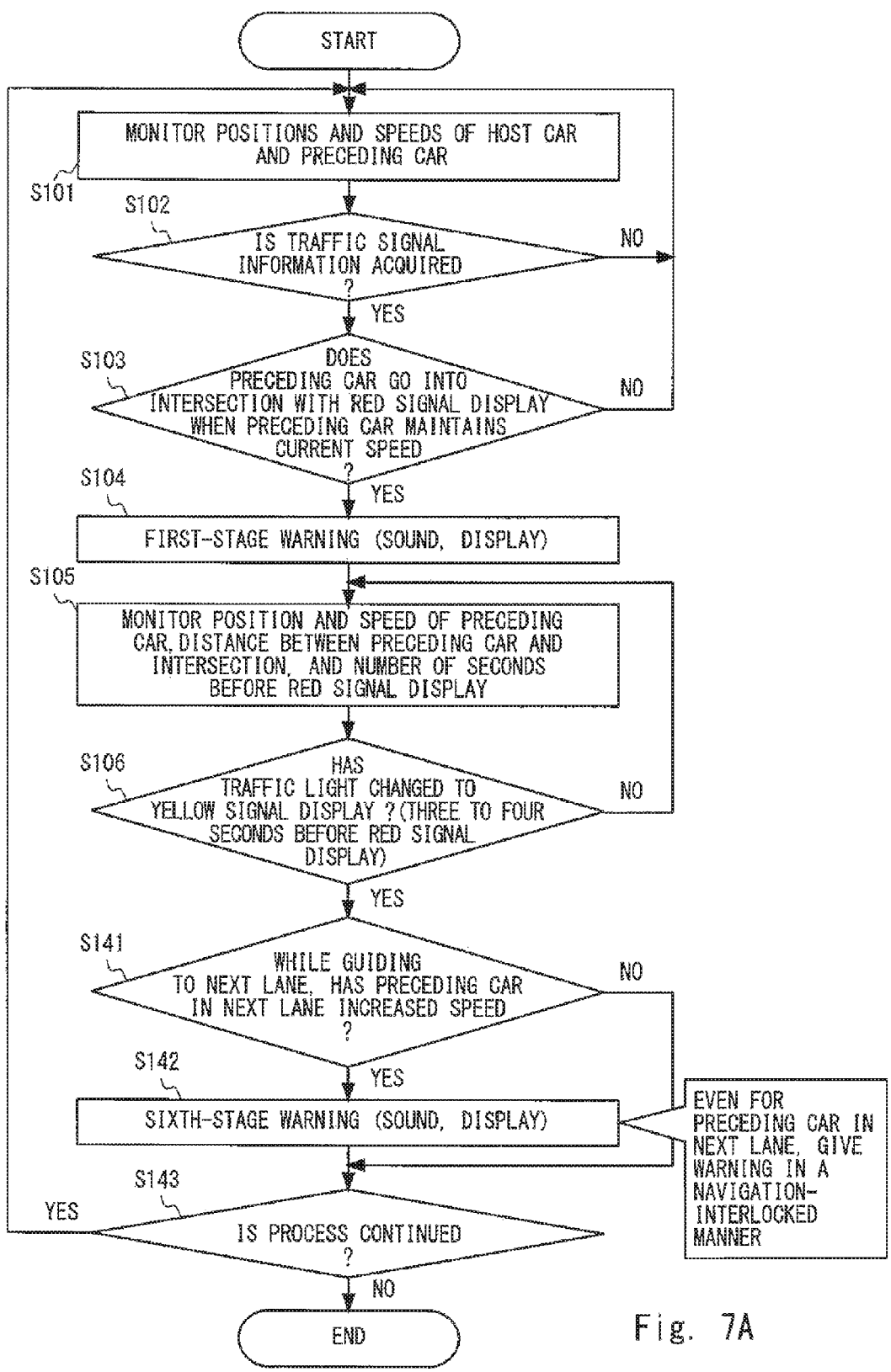
FIG. 7A is a flowchart for explaining an operation in a fifth exemplary embodiment of an electronic device.

Next, an operation in a fifth exemplary embodiment is explained. FIG. 7A is a flowchart for explaining an operation in the fifth exemplary embodiment of an electronic device. In FIG. 7A, the same symbols as those in FIG. 2 are assigned to the same process steps as those shown in FIG. 2 and their explanations are omitted. In this exemplary embodiment, processes in steps S141 to S143 are performed in place of the processes in the step S107 and the subsequent steps in the flowchart shown in FIG. 2. In this exemplary embodiment, it is predicted, when the navigation device is guiding the host car to move to a next lane, whether or not a preceding car present in the next lane is in a situation in which after the preceding car has increased its speed while a traffic light is in a yellow signal display state, the preceding car almost goes into an intersection while the traffic light is in a red signal display state and, as a result, the preceding car brakes suddenly. Then, a warning is given to the driver.

Figure 7B:
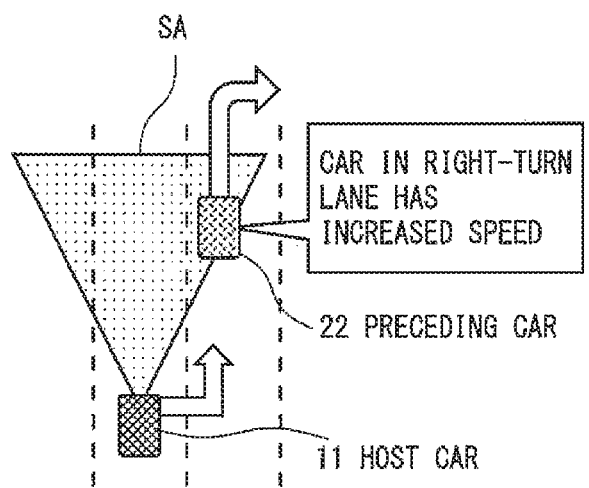
FIG. 7B is a figure for explaining operations in main steps of the fifth exemplary embodiment of the electronic device.

In this case, when the control unit 105 determines that it is the timing when the traffic light in the intersection changes from a blue signal display state to a yellow signal display state in the step S106 in FIG. 7A, then the control unit 105 determines, at the timing when the traffic light changes to the yellow signal display state, whether or not the navigation device is guiding the host car to a next lane and a preceding car that is present in the next lane has increased its speed (step S141 in FIG. 7A). That is, in the step S141, as shown in FIG. 7B as an example, when the navigation device is guiding the host car 11 to move to a next right-turn lane in order to turn right at the next intersection, a vehicle that is traveling in a sensing area (i.e., a detection area) SA located ahead of the host car 11 in the traveling direction thereof and traveling in the next right-turn lane will become a preceding car 22 after the lane change. Therefore, the control unit 105 determines whether or not the preceding car 22 has increased its speed, and when the control unit 105 determines that the preceding car has increased the speed, predicts that there is a possibility that the preceding car cannot stop safely, for the red signal display state of the traffic light or the like, at the stop line position located before the intersection without braking suddenly because the preceding car has increased the speed.

When the control unit 105 determines that the preceding car has increased the speed in the step S141, the control unit 105 gives, as a sixth warning, a warning indicating that the preceding car has increased the speed and/or a warning against the collision or the like because of the possibility that the preceding car is about to go into the intersection at the timing when the traffic light is in the red signal display state and hence the preceding car could brake suddenly at the intersection by using a sound, an image display, and/or the like (step S142 in FIG. 7A). On the other hand, when the control unit 105 determines that the navigation device is not guiding the host car to the next lane, that there is no behavior indicating the move to the next lane, that no preceding car is present in the destination lane, i.e., in the next lane, or that the preceding car in the next lane has not increased the speed in the step S141 (No at step S141), the control unit 105 predicts that the preceding car will not brake suddenly and determines whether or not the process should be continued (step S143). When the sixth warning is given in the step S142, the control unit 105 also determines whether or not the process should be continued (step S143). When the driver has made a request for terminating the process by entering an instruction or the like through the operation unit 108 or when there is no need to continue the process because the host car is parked or the like, the process is not continued. When the process should be continued, it returns to the step S101.

Note that the process in the fifth exemplary embodiment may be combined with at least one of the processes in the first to fourth exemplary embodiments, or may be combined with the below-shown processes. Further, the determination on whether or not the preceding car in the next lane has increased its speed may be made by using the same criterion as that used in the determination on the increase in the speed of the preceding car traveling in the same lane as that of the host car as in the case of the second exemplary embodiment. Alternatively, the determination on the increase in the speed may be made by using other methods.

Figure 8A:
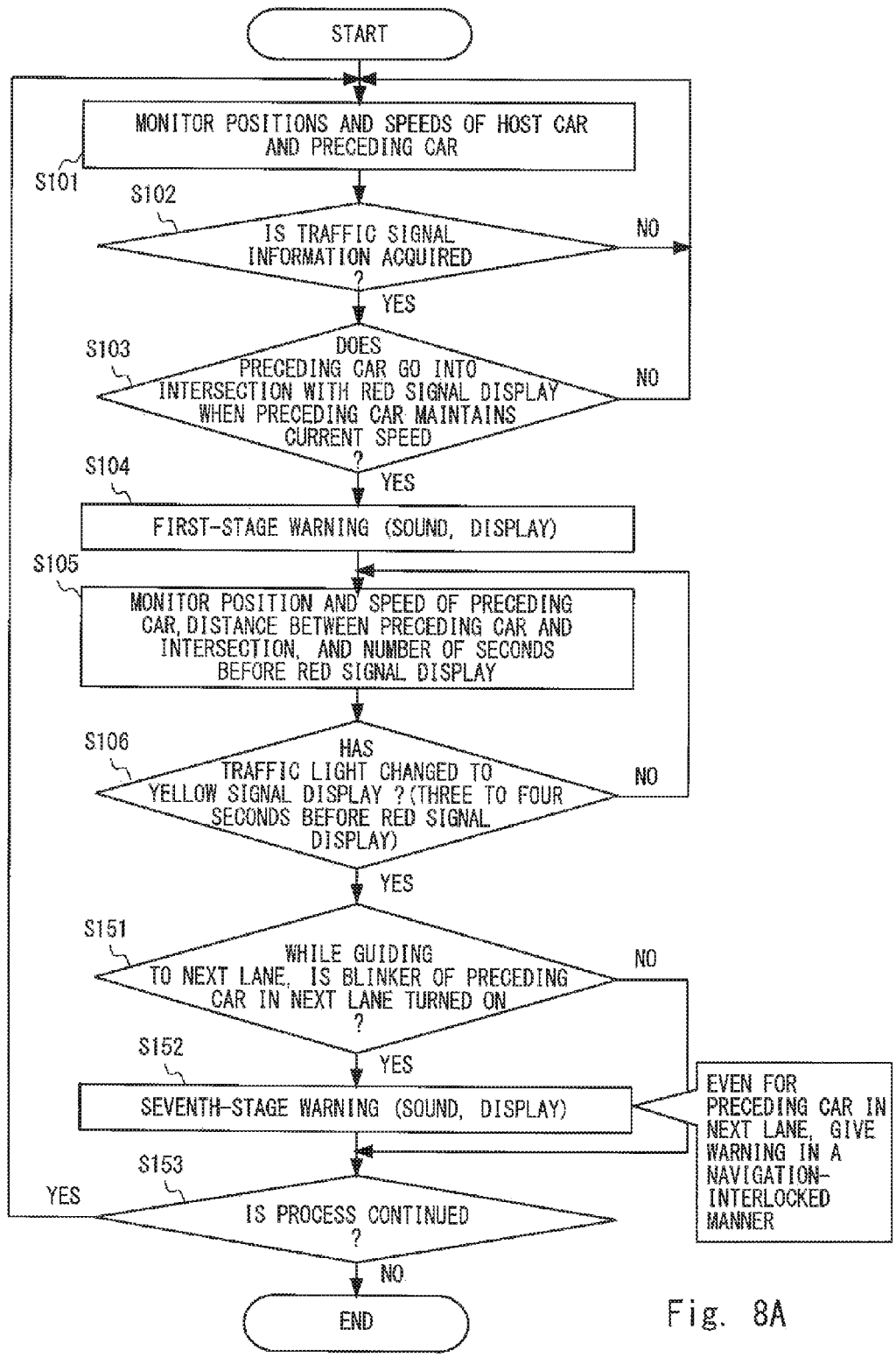
FIG. 8A is a flowchart for explaining an operation in a sixth exemplary embodiment of an electronic device.

Next, an operation in a sixth exemplary embodiment is explained. FIG. 8A is a flowchart for explaining an operation in the sixth exemplary embodiment of an electronic device. In FIG. 8A, the same symbols as those in FIG. 2 are assigned to the same process steps as those shown in FIG. 2 and their explanations are omitted. In this exemplary embodiment, processes in steps S151 to S153 are performed in place of the processes in the step S107 and the subsequent steps in the flowchart shown in FIG. 2. In this exemplary embodiment, it is predicted, when the navigation device is guiding the host car to move to a next lane, whether or not a preceding car present in the next lane is in a state in which the preceding car turns on a blinker and could brake suddenly in order to turn right or left. Then, a warning is given to the driver.

Figure 8B:
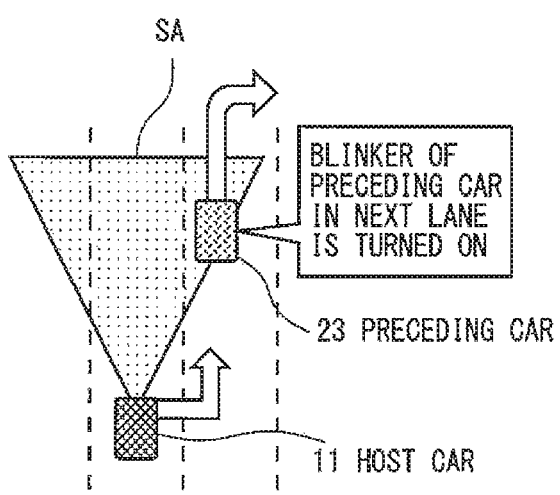
FIG. 8B is a figure for explaining operations in main steps of the sixth exemplary embodiment of the electronic device.

In this case, when the control unit 105 determines that it is the timing when the traffic light in the intersection changes from a blue signal display state to a yellow signal display state in the step S106 in FIG. 8A, then the control unit 105 determines, at the timing when the traffic light changes to the yellow signal display state, whether or not the navigation device is guiding the host car to a next lane and a preceding car that is present in the next lane turns on a blinker (step S151 in FIG. 8A). That is, in the step S151, as shown in FIG. 8B as an example, when the navigation device is guiding the host car 11 to move to a next right-turn lane in order to turn right at the next intersection, a vehicle that is traveling in a sensing area (i.e., a detection area) SA located ahead of the host car 11 in the traveling direction thereof and in the next right-turn lane will become a preceding car 23 after the lane change. Therefore, the control unit 105 determines whether or not the preceding car 23 has turned on a blinker to turn right, and when the control unit 105 determines that the preceding car 23 has turned on the blinker, predicts that there is a possibility that the preceding car 23 could brake suddenly and, as a result, the host car 11 could bump into the preceding car 23.

When the control unit 105 determines that the navigation device is guiding the host car to move to a next lane and a preceding car present in the next lane has turned on a blinker in the step S151, the control unit 105 determines that there is a possibility that the host car could bump into the preceding car and gives a seventh warning by using a sound, an image display, and/or the like (step S152 in FIG. 8A). On the other hand, when the control unit 105 determines that the navigation device is not guiding the host car to the next lane, that there is no behavior indicating the move to the next lane, that no preceding car is present in the destination lane, i.e., in the next lane, or that the preceding car in the next lane has not turned on a blinker in the step S151 (No at step S151), the control unit 105 predicts that the preceding car will not brake suddenly and determines whether or not the process should be continued (step S153). When the seventh warning is given in the step S152, the control unit 105 also determines whether or not the process should be continued (step S153). When the driver has made a request for terminating the process by entering an instruction or the like through the operation unit 108 or when there is no need to continue the process because the host car is parked or the like, the process is not continued. When the process should be continued, it returns to the step S101.

Note that the process in the sixth exemplary embodiment may be combined with at least one of the processes in the first to fifth exemplary embodiments. Further, the determination on whether or not the preceding car in the next lane has turned on a blinker may be made by using the same criterion as that used in the determination on the turning-on of the blinker of the preceding car traveling in the same lane as that of the host car as in the case of the third exemplary embodiment. Alternatively, the determination on the turning-on of a blinker may be made by using other methods.

Note that the present invention is not limited to the above-described exemplary embodiments and includes the below-shown various modified examples. For example, although it is explained that the second-stage warning informs the driver that there is a possibility of a collision and thereby urges the driver to perform a speed-reducing operation in the above-described exemplary embodiments, the vehicle may be forcibly controlled so that its speed is reduced without having the driver perform the speed-reducing operation.

Further, when there is a possibility that a preceding car goes into an intersection where a traffic light is in a red signal display state, it may be determined that the behavior of the preceding car could be in one the following two states: (1) the preceding car goes into the intersection and passes through the intersection without braking suddenly; and (2) the preceding car brakes suddenly and hence there is a possibility of a collision. This determination can be made by determining whether a brake light of the preceding car is turned on or detecting the change in the speed of the preceding car.

That is, if the speed of the preceding car does not change or the preceding car is accelerating when or after the traffic light changes to a yellow signal display state, it may be determined that there is a possibility that the preceding car will pass through the intersection where the traffic light is in a red signal display state and hence no warning may be given. Alternatively, when the preceding car is accelerating, it may be determined that the possibility that the preceding car brakes suddenly is higher and hence the third-stage warning may be given. When it is detected that a brake light is turned on, it may be determined that the possibility that the preceding car will stop is high. Further, the possibility of a collision may be determined based on the speeds of the preceding car and the host car at that moment, and it may be determined whether or not a warning should be output.

Further, in the step S106, the determination of the state in which the traffic light becomes a yellow signal display state may be made by taking an image of the traffic light located ahead of the host car by using the image pickup device 201 and recognizing that the traffic light is yellow by the detection unit 102.

Further, as the condition for issuing a warning in the steps S104 and S108, at least one of the following conditions may be added: (1) the speed of the host car is equal to or higher than a certain speed; (2) the relative speed between the host car and the preceding car is equal to or higher than a certain speed; and (3) the distance between the host car and the preceding car is equal to or shorter than a certain distance.

Further, although the position of the preceding car and the relative speed between the host car and the preceding car are calculated by the detection unit 102 based on image information of the preceding car taken by the image pickup device 201 and information detected by the sensor 202 in the step S101, the position of the preceding car and the relative speed between the host car and the preceding car may be calculated by the detection unit 102 based on only one of the image information of the preceding car taken by the image pickup device 201 and information detected by the sensor 202.

Note that the present invention includes a control method for an electronic device performing the processes explained above with reference to the flowcharts shown in FIGS. 2, 4, 5, 6A, 7A and 8A, and a control program for an electronic device executed by a software process of a computer. The control program for an electronic device may be distributed through a communication network and downloaded into a computer, or may be recoded in a recording medium, distributed through the recording medium, and installed into a computer.

Although the present invention has been explained with reference to certain exemplary embodiments, the present invention is not limited to those exemplary embodiments. Various modifications can be made to the configurations and the details of those exemplary embodiments by those skilled in the art without departing from the spirit and scope of the present invention.

What is claimed is:

1. An electronic device comprising:
a monitor unit configured to monitor a traveling speed and a traveling position of a host car, and a speed and a position of a preceding car, the host car being a vehicle in which the electronic device is mounted, the preceding car being a vehicle traveling ahead of the host car;
a reception unit configured to receive traffic signal information including at least a current display state of a traffic light in an intersection located ahead of the host car in a traveling direction and timing information of a change of the display state of the traffic light;
a prediction unit configured to generate a first prediction result of a prediction whether or not the preceding car will go into the intersection after the traffic light changes to a red signal display state when the preceding car maintains a current speed based on monitor information and the traffic signal information received by the reception unit, and generate, at a timing when the traffic light becomes the yellow signal display state, a second prediction result of a prediction whether or not the preceding car can stop before the intersection without braking suddenly based on the position and the speed of the preceding car and a distance between the preceding car and the intersection, the monitor information including the traveling speed and the traveling position of the host car and the speed and the position of the preceding car monitored by the monitor unit; and
a warning unit configured to give a first-stage warning when the first prediction result indicates that the preceding car will go into the intersection after the traffic light changes to the red signal display state, and give a second-stage warning when the second prediction result indicates that the preceding car cannot stop before the intersection without braking suddenly.

2. The electronic device according to claim 1, wherein the prediction unit generates the second prediction result within a period in which the current display state of the traffic light is determined to be a yellow signal display state based on the received traffic signal information.

3. The electronic device according to claim 1, wherein
the prediction unit generates a third prediction result when at least one of an increase in the speed of the preceding car and turning-on of a blinker of the preceding car is detected after the current display state of the traffic light is determined to be the yellow signal display state based on the received traffic signal information, and
the warning unit warns the user of host car based on the third prediction result.

4. A control method for an electronic device comprising:
a monitoring step for monitoring a traveling speed and a traveling position of a host car, and a speed and a position of a preceding car, the preceding car being a vehicle traveling ahead of the host car;
a receiving step for receiving traffic signal information including at least a current display state of a traffic light in an intersection located ahead of the host car in a traveling direction and timing information of a change of the display state of the traffic light;
a predicting step for generating a first prediction result of a prediction whether or not the preceding car will go into the intersection after the traffic light changes to a red signal display state when the preceding car maintains a current speed based on monitor information and the traffic signal information received in the receiving step, and generating, at a timing when the traffic light becomes the yellow signal display state, a second prediction result of a prediction whether or not the preceding car can stop before the intersection without braking suddenly based on the position and the speed of the preceding car and a distance between the preceding car and the intersection, the monitor information including the traveling speed and the traveling position of the host car and the speed and the position of the preceding car monitored in the monitoring step; and
a warning step for giving a first-stage warning when the first prediction result indicates that the preceding car will go into the intersection after the traffic light changes to the red signal display state, and giving a second-stage warning when the second prediction result indicates that the preceding car cannot stop before the intersection without braking suddenly.

5. A control program for an electronic device for causing a computer to execute:
a monitoring step for monitoring a traveling speed and a traveling position of a host car, and a speed and a position of a preceding car, the preceding car being a vehicle traveling ahead of the host car;
a receiving step for receiving traffic signal information including at least a current display state of a traffic light in an intersection located ahead of the host car in a traveling direction and timing information of a change of the display state of the traffic light;
a predicting step for generating a first prediction result of a prediction whether or not the preceding car will go into the intersection after the traffic light changes to a red signal display state when the preceding car maintains a current speed based on monitor information and the traffic signal information received in the receiving step, and generating, at a timing when the traffic light becomes the yellow signal display state, a second prediction result of a prediction whether or not the preceding car can stop before the intersection without braking suddenly based on the position and the speed of the preceding car and a distance between the preceding car and the intersection, the monitor information including the traveling speed and the traveling position of the host car and the speed and the position of the preceding car monitored in the monitoring step; and
a warning step for giving a first-stage warning when the first prediction result indicates that the preceding car will go into the intersection after the traffic light changes to the red signal display state, and giving a second-stage warning when the second prediction result indicates that the preceding car cannot stop before the intersection without braking suddenly.

* * * * *